United States Patent
Blank et al.

(10) Patent No.: US 7,295,548 B2
(45) Date of Patent: Nov. 13, 2007

(54) METHOD AND SYSTEM FOR DISAGGREGATING AUDIO/VISUAL COMPONENTS

(75) Inventors: William Thomas Blank, Bellevue, WA (US); Donald M Gray, III, San Francisco, CA (US); Robert George Atkinson, Woodinville, WA (US); Anand Valavi, Sunnyvale, CA (US)

(73) Assignee: Microsoft Corporation, Redmond, WA (US)

(*) Notice: Subject to any disclaimer, the term of this patent is extended or adjusted under 35 U.S.C. 154(b) by 1074 days.

(21) Appl. No.: 10/306,340

(22) Filed: Nov. 27, 2002

(65) Prior Publication Data
US 2004/0100942 A1 May 27, 2004

(51) Int. Cl.
*H04L 12/66* (2006.01)
(52) U.S. Cl. .................... 370/352; 370/487
(58) Field of Classification Search ............ None
See application file for complete search history.

(56) References Cited

U.S. PATENT DOCUMENTS

| | | | |
|---|---|---|---|
| 5,872,784 A | 2/1999 | Rostoker et al. | |
| 6,496,509 B1* | 12/2002 | Fant | 370/400 |
| 6,513,003 B1* | 1/2003 | Angell et al. | 704/235 |
| 6,687,770 B1* | 2/2004 | Mahe et al. | 710/53 |
| 6,711,623 B1* | 3/2004 | Furukawa et al. | 709/249 |
| 6,831,899 B1* | 12/2004 | Roy | 370/260 |
| 6,895,009 B1* | 5/2005 | Stallkamp | 370/394 |
| 7,043,749 B1* | 5/2006 | Davies | 725/120 |
| 2005/0265332 A1* | 12/2005 | Lim et al. | 370/389 |

FOREIGN PATENT DOCUMENTS

| | | |
|---|---|---|
| EP | 1 179 764 | 2/2002 |
| WO | WO97/41504 | * 11/1997 |
| WO | WO 99/63698 | 12/1999 |
| WO | WO 01/03387 | 1/2001 |

\* cited by examiner

*Primary Examiner*—Edan Orgad
*Assistant Examiner*—Blanche Wong
(74) *Attorney, Agent, or Firm*—Shook, Hardy & Bacon L.L.P.

(57) ABSTRACT

The present invention is directed to a method and system for disaggregating and connecting A/V components, and communicating A/V content stream information. An A/V stream from a source device is packaged for transmission over an IP network to one or more output devices. A brick device enables the integration of legacy A/V systems into the network supported A/V system. The brick device operates to provide analog signal and IP protocol conversion, along with the synchronization of received A/V stream data packets. The rendering and play of the A/V stream content on multiple output devices is synchronized to overcome distortions and other network idiosyncrasy and to facilitate a pleasant user experience.

13 Claims, 3 Drawing Sheets

METHOD AND SYSTEM FOR DISAGGREGATING AUDIO/VISUAL COMPONENTS

CROSS-REFERENCE TO RELATED APPLICATIONS

None.

TECHNICAL FIELD

The present invention relates to audio/visual systems. More particularly, the invention relates to a system and method for connecting, disseminating and experiencing audio/visual content streams.

BACKGROUND OF THE INVENTION

Audio/Visual (A/V) content in the home today involves a plethora of hardware and software components from a wide variety of manufacturers. These components have not fully leveraged the various advancements in interoperability and device connection and communications that exist today. A typical A/V system setup is comprised of multiple devices hard-wired to one another, often times through a tuner/source switcher. As a result, the bulk of the functionality of such systems is generally provided in one room or within a limited area of a house. For example, in a typical home with reasonably capable A/V components, a child's room may have a Compact Disk (CD) player, speakers and a Television (TV) but the TV is probably not connected to the external speakers. Whereas, the TV, Digital Video Disk (DVD), VCR, speakers and stereo system in the family room are all connected together.

While it may be possible to interconnect the components in the child's room in a stand alone manner or in combination with the family room, most people will attest to the complexity and hassle of running wire from component to component or to speakers all around a room, let alone all around a house.

A typical example of the A/V system and connection in a home will be discussed with reference to FIG. 1. As illustrated, a typical home system may include a Satellite Receiver Cable Box 102, a PC with a digital music player 104, a VCR 106, a CD/DVD Player 108, a Tuner or Source Switcher 110, a TV 112, a Sound Processor 114, an Amplifier 116, and a Left Channel Speaker 118 and Right Channel Speaker 120.

The Satellite Receiver 102, the PC 104, VCR 106, CD/DVD 108 and TV 112 (collectively referred to as source devices) are all connected to the Tuner/Source Switcher 110. Generally, each source device is individually connected to the Tuner Source Switcher 110 via a pair of audio cables. Each pair of audio cables provides a signal for the left and right channels of the system. Alternatively, a digital point to point interconnect could be used such as Sony/Phillips Digital Interface Format (SPDIF) which is an isochronous interconnect. These signals are then ultimately channeled to the appropriate one of the Left and Right Channel Speakers 118, 120. A Sound Processor 114 can be incorporated in the Tuner 110 or in some cases is contained in a separate device. In either case, the Sound Processor 114 provides further processing of the source signal to generate sounds such as stereo, surround sound and other such sound effects. The Amplifier 116 can also be incorporated within the same unit as the Tuner 110 and Sound Processor 114. The Amplifier 116 provides amplification of the signals to both the Left Channel Speaker 118 and the Right Channel Speaker 120.

Generally speaking, the functions described thus far are only feasible if the individual components are properly connected to one another. Problems tend to arise because users are faced with multiple connectors and multiple wires which must be properly connected. Further compounding the user's dilemma is the need to distribute or extend the audio/visual information to multiple rooms within the home. Traditional stereo systems do not lend themselves to distributed control nor extensive wiring of speakers or other components over great distances. In this regard there have been no major advances with A/V systems that leverage any of the recent technology revolutions relating to data communications. Attempts to address electronic A/V communication issues have typically been hampered by limitations that are attributable to the current hard wired mode of operation and the physical components that are used today. For example, the quality of A/V reproduction diminishes as one attempts to place output components at great distances from source components. In part this is due to signal loss within the physical wires that are used and the lack of a simple way to control multiple connected devices.

Attempts to work around or resolve some of the connection problems related to the extensive wiring discussed above have included special purpose schemes that communicate between components wirelessly or non-standard schemes that attempt to utilize the AC wiring of the home as a medium to communicate between A/V components. These attempts have fallen short of their mark in numerous ways. Some of the shortcomings include poor sound quality due to factors such as noise or interference from other devices. Other shortcomings are related to expense due to the non-standard hardware approach. The expense of incorporating sufficiently sophisticated transmitters and receivers at a reasonable cost in home A/V systems to enable A/V distribution via such mediums has been prohibitive.

The need to sever the close tie between source A/V devices and output A/V devices necessitates a communication paradigm that provides a low cost, transparent and intelligent link between such devices.

In light of the foregoing, there exists a need to provide a system and method that will enable the disaggregation of A/V components. More importantly, such disaggregation would be based on a methodology that is independent of the location of any participating components and any underlying communication protocols. Furthermore, there exists a need for a system and method that also provides a flexible scheme and pleasurable user experience for the installation and utilization of such A/V components. Even further there exists a need for a system that addresses the limitations of locale and the physical proximity of A/V components.

SUMMARY OF THE INVENTION

The present invention is directed to a method and system for connecting A/V components and communicating A/V content stream information.

In one aspect, the present invention is directed to an A/V stream from a source device that is packaged for transmission over a network to one or more output devices.

In another aspect, the present invention is directed to the use of the IP network protocol.

In yet another aspect, the present invention is directed to a device that enables the integration of legacy A/V systems into a network supported A/V system.

In a further aspect, the present invention is directed to synchronizing the rendering and playing of A/V stream information on multiple output devices.

In an even further aspect, the present invention is directed to a system and method for establishing a tight time synchronization among networked A/V devices.

The invention provides for an A/V stream from a source device to be packaged for transmission over an IP network to one or more output devices. A brick device enables the integration of legacy A/V systems into the network supported A/V system. The brick device operates to provide analog signal and IP protocol conversion, along with the synchronization of received A/V stream data packets. The rendering and play of the A/V stream content on multiple output devices is synchronized to overcome distortions and other network idiosyncrasy and to facilitate a pleasant user experience.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE SEVERAL VIEWS OF THE DRAWING

The present invention is described in detail below with reference to the attached drawings figures, wherein.

DETAILED DESCRIPTION OF THE INVENTION

The present invention is directed to a system and method for disaggregating A/V components and enabling the remote placement of such components throughout a particular location or in geographically disperse areas. The present invention provides communication between source and destination A/V components by using a network communication protocol that is independent of the actual medium between the components.

Figure 2:
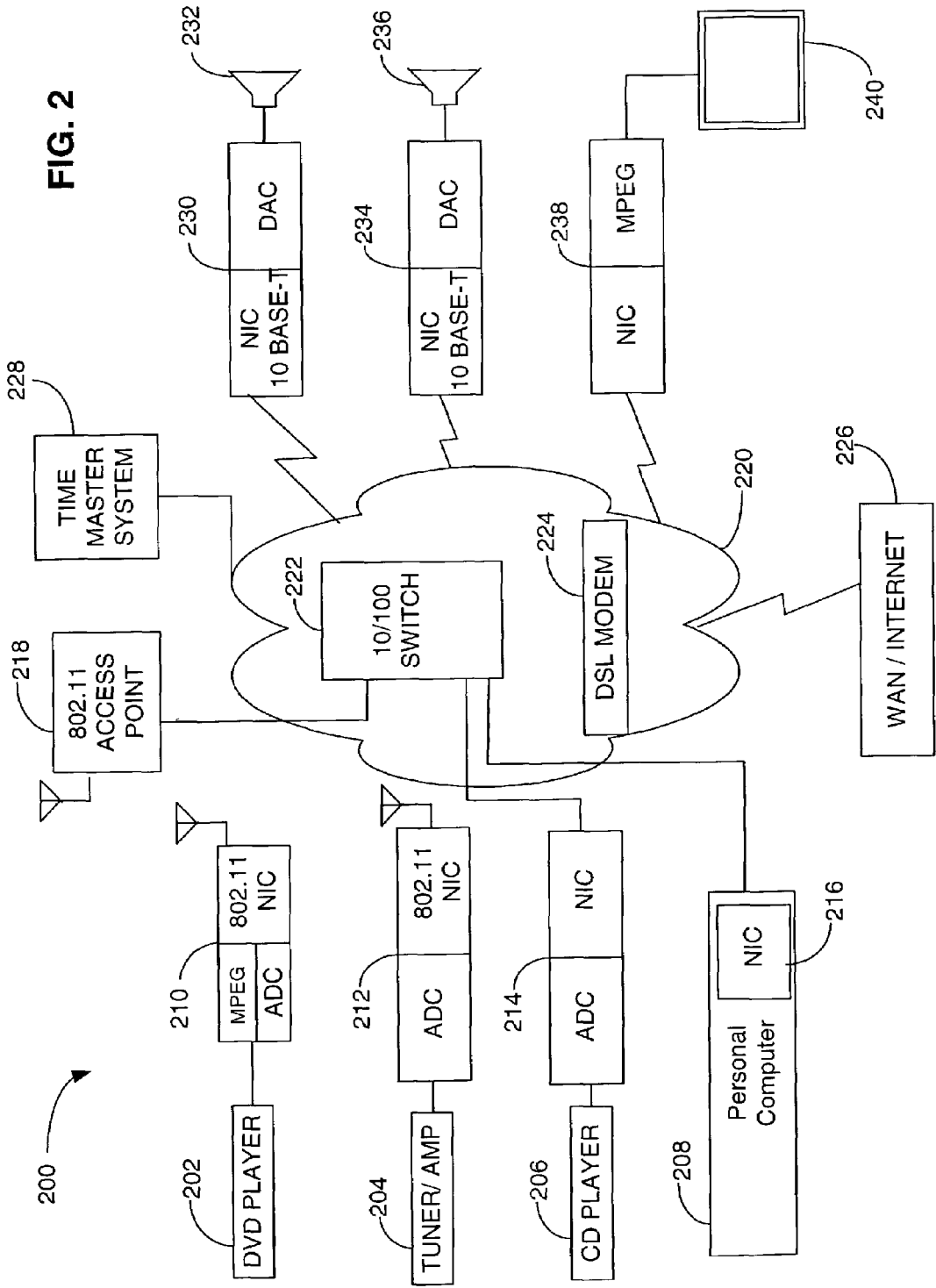
FIG. 2 is an illustrative block diagram of an audio/visual connection in an IP network that incorporates the present invention.

In one embodiment, various A/V components are connected via any variety of Internet Protocol (IP) networks such as IEEE 802.11, 10Base-T and HPNA. An exemplary network 200 illustrating various connections is shown in FIG. 2. Using such an IP network can provide disaggregated A/V stream delivery, but other issues inherent to IP networks introduce synchronization problems in the content delivery.

These synchronization problems are addressed by the present invention along with issues relating to transmission delays. The present invention further provides for the integration and use of legacy A/V components in an IP stream delivery system through the use of a 'brick'. A 'brick' as used herein is essentially a group of hardware and software components that provide the interchange between an IP network and the traditional analog circuitry of an A/V component or system. A more detailed discussion on the brick will follow with reference to FIG. 3. For illustrative purposes, there will be references made to bricks of various types merely to aid in the description of the diagrams and to indicate the possible differences in components. However, the brick is conceptually an IP half and an A/V media half regardless of the discussed type.

Returning to FIG. 2, the exemplary network 200 is shown. In the network 200, a host of A/V components are interconnected. More specifically, a Digital Video Disc (DVD) player 202, a Tuner 204, a Compact Disk (CD) player 206 and a Personal Computer (PC) 208, each of which are considered a source device, are connected via a variety of interfaces to an IP communication cloud 220. Receiving devices, such as speakers (left channel 232 and right channel 236) and a display 240 are also connected to the communication cloud 220. The invention is in no way limited to the particular source or receiving devices shown in FIG. 2. Additionally, a time master device 228 that facilitates network synchronization is also connected to the communication cloud 220. Also shown is an access point device 218, which provides the interface for any one of a number of wireless network devices. As previously suggested, the network 200 can include a Wide Area Network (WAN) and the Internet. A block 226 is shown to illustrate connection of the Internet to the communication cloud 220. The communication cloud 220 may further include several interconnected components such as DSL modem 224, 10/100 switch 222, routers and other such communication coupling devices.

As would be understood by those skilled in the art, each of the A/V devices and components discussed above require an interface to enable connection to the network cloud 220. For the purpose of illustration and not limitation, some components are shown and discussed as having a particular type of IP network connection. It should be understood that the type of IP interface or connection is transparent to the system and method of the present invention. Furthermore, although the interface to the communication cloud 220 is shown as a separate component, the present invention also anticipates that some or all of the components could also be incorporated directly into A/V devices. When incorporated into the A/V device, a separate brick interface is unnecessary. But to accommodate legacy A/V sources and receiving devices, a brick must be provided.

In the present illustration, the DVD player 202 is shown connected via a type-1 brick 210. The type-1 brick 210 contains an MPEG converter which handles the video portion of the information from the DVD player 202. Also found within type-1 brick 210 is an analog-to-digital converter (ADC) for handling the analog portions of the signals from the DVD player 202. Another component of the type-1 brick 210 is the network interface. Connectivity to the network can be provided through a particular Network Interface Card (NIC) or some other integrated circuitry. In the case of the illustrated DVD player 202, an 802.11 NIC is utilized to provide wireless connectivity to the communication cloud 220. Wireless connectivity is completed via the 802.11 access point 218. Thus, type-1 brick 210 enables the flow of A/V content from source DVD player 202 onto the WP network 200 for rendering at any of a number of IP compatible A/V receiving devices.

In a somewhat similar manner to the DVD player 202, the tuner/amplifier 204 is also connected to the communication cloud 220 of the IP network 200. The tuner/amplifier 204 is connected via a type-2 brick 212. The type-2 brick 212 contains an analog-to-digital converter (ADC) for handling the analog audio portions of the signals from the tuner/amplifier 204. The type-2 brick 212 also contains a network interface, for placing source information on the IP network 200. In this case connectivity is also provided by an 802.11 NIC.

CD player 206 is also connected to the communications cloud 220. The CD player 206 is connected via a type-3 brick 214. The type-3 brick 214 contains an analog-to-digital converter (ADC) for handling the analog portions of the signals from the CD player 206. The type-3 brick 214 provides network connectivity, through a 10Base-T NIC, which is wired directly to the 10/100 switch 222 of the communication cloud 220.

As shown, a PC 208 can also be connected to the communication cloud 220 via any one of a number of appropriate network interface cards 216. In this case, the NIC 216 is embodied within the PC 208 and is wired to the 10/100 switch 222.

All of the signals from any source A/V device 202-208 are ultimately consumed by one or more receiving devices. The receiving devices render or otherwise present the signals for the listening/viewing pleasure of an end user. Exemplary receiving devices for some A/V streams are illustrated as speakers 232, 236 and display 240. Left channel speaker 232 is connected to and receives information from the communication cloud 220 via a type-4 brick 230. Right channel speaker 236 is also connected to and receives information from the communication cloud 220 via a type-4 brick 234. The type-4 bricks 230, 234 include a network interface, such as a 10Base-T NIC and a digital-to-analog converter (DAC). In effect, the type-4 bricks 230, 234 receive and convert IP stream information into analog signals that can be played by the speakers 232, 236. The video display 240 is able to render graphical images that are received from the communication cloud 220 via a type-5 brick 238. The type-5 brick 238 includes a NIC and an MPEG decoder for decompressing video signals.

It will be understood by those skilled in the art that the description of each of the above bricks has been greatly simplified for purposes of clarity. A more detailed discussion of the brick and specifically the type-5 brick will ensue with reference to FIG. 3. It will also be understood that other brick types are within the scope of the present invention and each contains similar and appropriate components that are suited to the particular A/V device to which the brick is connected.

Figure 3:
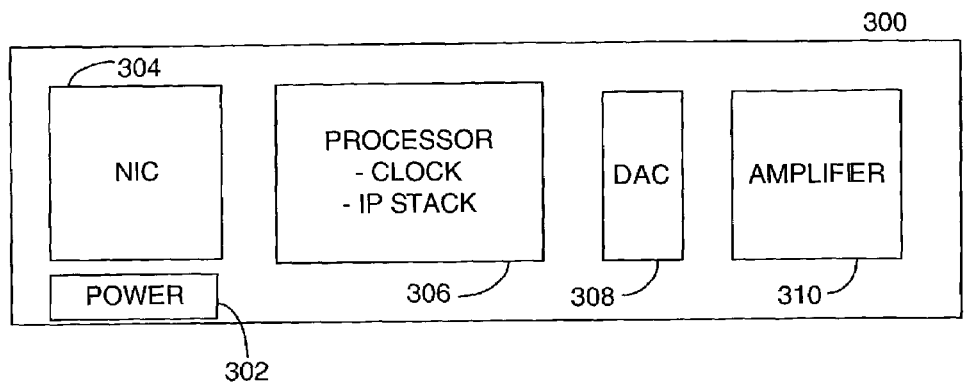
FIG. 3 is a block diagram of an audio/visual brick enabling backward compatibility of legacy audio visual components with the present invention.

Turning to FIG. 3, a type-5 brick is shown and generally referenced as a brick 300. The brick 300 can be a stand alone component and is primarily intended as a transitional device, which enables users to enjoy the benefits of the present invention while still being able to minimize their investment. In other words, the brick 300 enables a user to connect standard A/V devices to an IP network 200. This is accomplished by providing physical and logical bridging connections that enable a user to utilize their existing A/V systems in an IP distribution network. In another embodiment of the present invention, the functionality of the brick 300 or its components are built into and incorporated into individual A/V components. This eliminates the need for a separate brick 300 component. In either case, the brick 300 includes an IP network dependent half and an A/V media half. The A/V media half varies depending on whether the brick is intended for a source or receiving device. Examples of source devices include tuners, microphones and DVD players, while receiving devices include speakers and displays.

Generally, the brick 300 includes a network communication component or Network Interface Card (NIC) 304, a power unit 302, a microprocessor component 306, a DAC component 308 and an amplifier 310. In the case of a stand alone brick 300, power is required for each of the components within the brick. This power is provided by power unit 302. As previously discussed NIC 304 provides the interface to an IP network. The microprocessor component 306 includes a clocking component and an IP stack interface. The microprocessor component 306 facilitates synchronization and other processes that are required for the functionality generally described herein. The DAC component 308 is ideally present when the brick is for a receiving type of A/V device while an ADC component would normally be found when the brick is for a source A/V device. Either converter component also incorporates a clocking mechanism to provide timing and synchronization of signals. The amplifier component 310 provides the analog processing that is needed to drive the receiving A/V system.

Having briefly described the environment of the present invention, the following discussion will focus on some of the other aspects of the invention, which are directed to the operation of A/V systems utilizing the present invention. As a general premise, IP networks do not guarantee the timely delivery of any information. A best effort packet delivery is what can be expected. In other words, a packet of data will get there when it gets there, if it gets there. This uncertainty of IP networks is attributable to delays, latency, jitters and other inherent network characteristics. But, the present invention provides a solution that enables A/V streams to be transmitted and received in a synchronized manner despite these setbacks of typical IP networks. In particular, the present invention provides the concept of 'tight time' synchronization for the transmission and play of A/V stream information.

A/V transmission and play synchronization is achieved by establishing a time synchronization between source and receiving devices. Time synchronization is attained by electing a time master on a network. All bricks and compliant IP A/V devices synchronize their clocks to the time master. In operation, A/V data packets that originate from a source device include a time stamp (t). The time stamp (t) is obtained from the time master device 228. Also included in the transmission data packet is a delay indication (d). In combination, these time related components of the data packet instruct the receiving device on when to render information. Essentially each receiving device will wait to render an associated packet until a particular time period (t+d). As such, all receiving devices will play the received information packet at the same moment in time—t+d regardless of when the information was actually received at the device from a source. For example, suppose there are two receiving devices, recvA and recvB. Further suppose a data packet takes x seconds to reach device recvA and y seconds to reach device recvB. To the extent that x and y seconds are less than the specified packet delay indication d, both recvA and recvB will play/render the packet at time t+d, in synchronization, regardless of when the packets were received.

The concept of tight-time provides a synchronization of the human perception of audio and video information in an IP network. Audio to video synchronization is commonly referred to as lip-synch. It is well known that the speed of sound is approximately one foot per millisecond and that the speed of light is approximately one foot per nanosecond. As such, visual information perceived by a human will reach the brain much quicker than any accompanying sound that is simultaneously generated. Through various experiments and studies within the art, it has been determined and generally accepted that a range of negative eight milliseconds (8 mSec) to positive twenty or thirty milliseconds (+20/30 mSec) is about the detection threshold for sound to visual delay. In other words, the delay between a visually perceived event and the accompanying sound must fall within the stated range in order to go unnoticed. More specifically, when dealing with A/V streams, if sound arrives eight milliseconds prior to the video or twenty milliseconds after the video it will not be noticeably disjointed to the human listener.

When audio information is directed to two or more speakers, a tighter phasing of the signals is required in order to ensure that there is no noticeable distortion to listeners. The simplest distortion is an echo but more subtle distortions occur due to signal cancellations. Tight timing for maintaining a quality stereo image (or for a larger number of channels) has not been clearly delineated in the academic literature but time accuracies in the tens of microseconds are clearly discernable. Some movie studios use a rule of thumb that the accuracy must be ¼ wavelength of the highest frequency of interest. Therefore, a 20 KHz signal, would require 12.5 microseconds timing accuracy. The present invention incorporates techniques to address and minimize the potential of such distortion, when signals are sent across a network to receiving devices. The technique is based on the concept of synchronized signal play by all receiving devices.

As stated above, the general rule of thumb is that synchronization to twelve microseconds (12 usec) should provide a studio quality listener experience. The synchronization is much less if only audio to video synchronization is required. All source and receiving devices of the present invention synchronize their clocks to provide a single reference point. Synchronization is achieved by referencing a single master time device 228. It should be noted however, that the synchronization accuracy of these device clocks is dependent on how each device is connected to the master time device for example, a wired versus a wireless connection. The propagation delay variance of the medium by which the receiving device is connected to the network, affects the accuracy of the synchronization time received from the master time device 228. However, to the extent that all receiving devices are in synch, it does not matter how far out of synch the collective receiving devices are with the source device. In other words a tight time synchronization between the receiving devices enables synchronized play and rendering and thus enhanced listening pleasure for a user. Thus a feature of the present invention is the provision of tight time synchronization.

Figure 4:
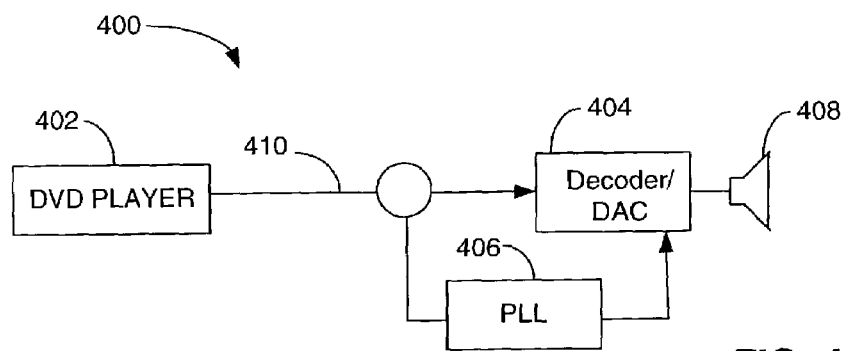
FIG. 4 is a block diagram illustrating the components and flow in a traditional audio visual connection of a DVD source player to a speaker output, for correlating output signals to source signals.
Figure 5:
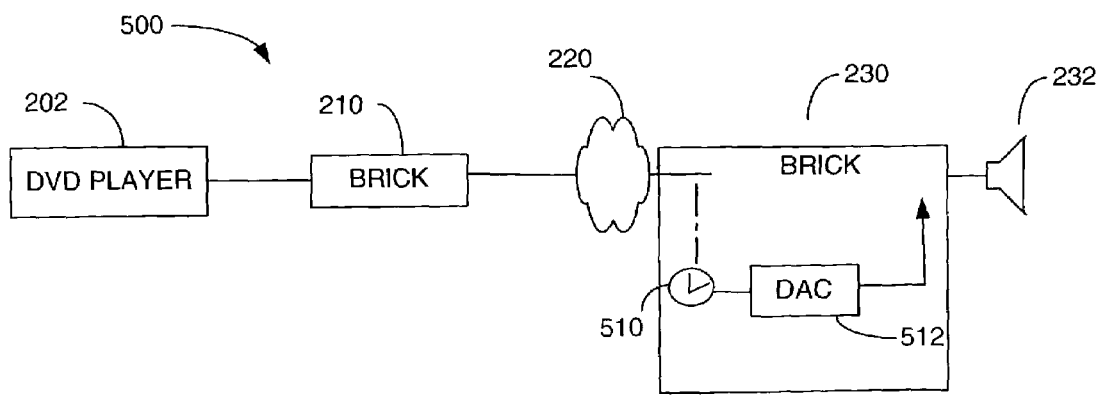
FIG. 5 is a block diagram illustrating the components and flow for synchronizing output signals with source signals in an audio/visual arrangement of a DVD player and speaker that utilize the present invention.

Having introduced the 'tight-time' concept of the present invention, the implementation of tight time for the synchronization of A/V streams will be discussed with reference to FIGS. 4 and 5. In FIG. 4, a traditional Phase Lock Loop (PLL) for handling Sony Philips Digital Interchange Format (SPDIF) information is illustrated. As shown, a source DVD 402 provides signals in SPDIF, which are sampled by a PLL 406 and received by a DAC 404 before being played through speaker cone 408. This arrangement is typically utilized to address the inconsistencies between the internal clocks of source devices such as the DVD 402 and a typical intermediate device such as DAC 404. For instance, although DVD 402 may be operating at a frequency of 44.1 kHz, and DAC 404 may also be operating at 44.1 kHz, the fact remains that due to the nature of electronic components, the two frequencies will not be exactly identical. The two frequencies may be off by fractions of a decimal. In other words, DVD 402 may actually be at 44.0877 kHz and DAC 404 at 44.0994 KHz. As such, over a prolonged period of time and every once in a while, there will exist a condition of buffer underflow or overflow in the DAC 404. In other words depending on which of the two components is faster, the DAC 404 may end up with an empty buffer, with nothing to pass on to the speaker. Alternatively, the DVD 402 may have no room in the DAC's buffer to place new information. PLL 406 enables a correction of this discrepancy. The correction results in identical phases between the devices and thus synchronization. PLL 406 listens to the incoming signal from the DVD 402 and adjusts DAC 404 accordingly, by speeding up or slowing down the flow of information out of the DAC 404 buffer.

In the present invention, source and receiving devices connected on the network 200 as shown in FIG. 2, are synchronized differently. FIG. 5 illustrates an arrangement within the present invention for providing synchronization between the source DVD player 202 and the speaker 232 of FIG. 2. As shown in FIG. 5, the source DVD 202 provides a signal to the source brick 210, which then places that information on the network communication cloud 220. The receiving brick 230 receives information from the network communication cloud 220 and enables play through the speaker cone 232. In this arrangement, synchronization is achieved through the connection of a clock 510 to a DAC 512, which then provides feedback to the brick 230 for regulating the rendering of the A/V stream information.

An A/V information stream originates at DVD 202 and is appropriately converted by Brick 210 to an IP protocol for transmission to one of several receiving devices connected to the network communication cloud 220. Transmission on an IP network is non-isosynchronous. In other words, an IP network transmits data packets on a varying time basis. As such, packets intended for a destination cannot be reliably expected to arrive at fixed time intervals or be in transit for a fixed length of time. Therefore, any synchronization of A/V stream information must be flexible and variable. A simplified solution that utilizes only a fixed time delay would therefore not attain the required high degree of continuous and sustainable synchronization that is required for the rendering of A/V streams. As such, the clock 510 is tied into the DAC 512 so that as the clock 510 speeds up or slows down in response to the IP network packet delivery, the rendering of sound by DAC 512 correspondingly speeds up and slows down. However, unlike the situation illustrated in FIG. 4, wherein PLL 406 can listen to incoming isosynchronous information, that option is not available when dealing with an IP network. In other words, it is not possible to tie-in a PLL to the non-isosynchronous stream of an IP network. A PLL can only operate in an isosynchronous environment.

Returning to FIG. 5, since their cannot be a direct tie-in to the stream from the network communication cloud 220, the present invention utilizes the independent time mechanism of the clock 510, along with the previously discussed time synchronization information that is embedded in the A/V IP stream. This combined information is then used to speed up and slow down the rendering of the A/V stream. A more detailed discussion on the use of common time to convert a non-isosynchronous network to a synchronous network can be found in the U.S. application patent Ser. No. 09/836,834, which is hereby incorporated.

Figure 1:
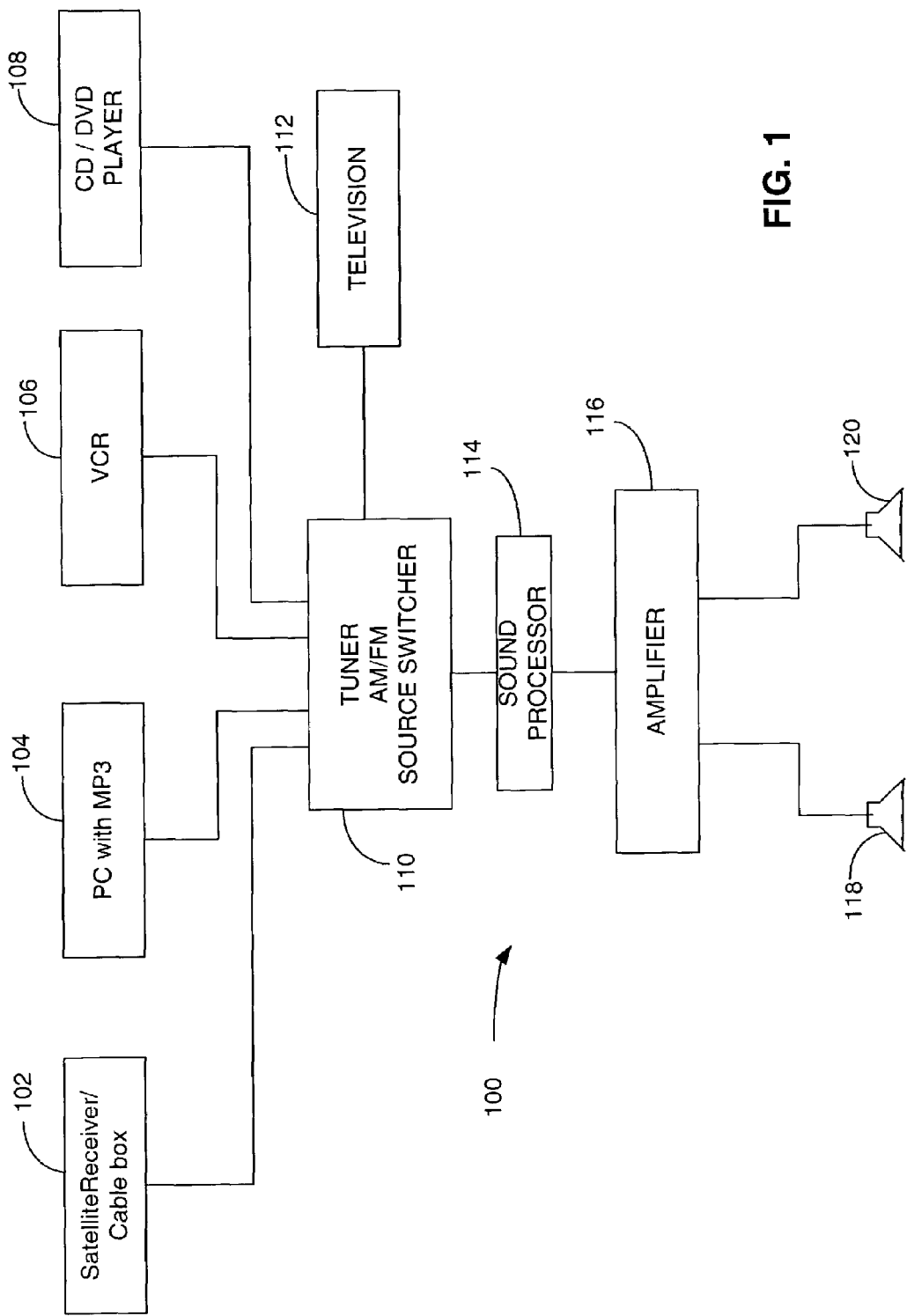
FIG. 1 is an illustrative block diagram of the typical connection of audio/visual components in a home.

When applied to multiple source and receiving devices the synchronization of A/V data results in simultaneous receiving output devices. A user is able to arbitrarily connect A/V devices over a network and disseminate A/V content across those devices while maintaining acceptable standards and quality for the listening pleasure of the user. Using the intrinsic network switching capability, the A/V switch of FIG. 1, may be completely eliminated. A/V content streams are mediated and synchronized for output at multiple receiving devices. The problems that result in distortion to a listener due to network distribution, and IP network idiosyncrasy are overcome by the system and method of the present invention.

As would be understood by those skilled in the art, a personal computer or other computing device may be configured to perform the functions described above. In particular, a personal computer operating environment may be utilized to implement the Time Master 228 of FIG. 2, the brick 300 of FIG. 3 or provide the functionality of any of the individual or combined devices illustrated in the exemplary network 200 of FIG. 2.

These functions could also be performed on any one or more computing devices, in a variety of combinations and configurations, and such variations are contemplated and within the scope of the present invention.

The present invention provides numerous advantages and objects relating to transmitting A/V information over a network to multiple devices, using an IP protocol, enabling the connection of legacy A/V devices to the network and providing for tight time rendering and synchronization at output devices without distorting the A/V content.

The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

We claim:

1. A method for disaggregating audio-visual systems comprising:
    providing an audio-visual stream from a source device as one or more data packets for communication over a non-isochronous link of a network;
    transmitting said one or more data packets over said non-isochronous link of said network, each of said one or more data packets having a time stamp and a maximum propagation delay indication appended thereto, said maximum propagation delay indication representing a predetermined transmission time of said one or more data packets;
    receiving said one or more data packets at multiple output devices and obtaining a time stamp, and a maximum propagation delay indication from each of the one or more received data packets; and
    rendering each of said one or more data packets on said multiple output devices in a synchronized fashion, wherein the synchronized fashion is based on an aggregation of said obtained maximum propagation delay indication and said obtained time stamp for each data packet.

2. The method of claim 1 wherein said source device and said multiple output devices are located in geographically disperse locales.

3. The method of claim 1 wherein said source device and a receiving device are located within close proximity and connected on a local area network.

4. The method of claim 1 wherein said data packets incorporate one or more rendering informational items or play informational items.

5. The method of claim 1 wherein said network is an IP network.

6. The method of claim 1 wherein control of the rendering of said audio-visual stream is through time manipulation by utilizing said one or more rendering informational items or play informational items to indicate when said output devices should begin rendering or playing said audio visual stream.

7. A system for disaggregating audio-visual systems comprising:
    a first and a second brick;
    an audio-visual source device; and
    one or more audio-visual output devices;
    wherein said audio-visual source device generates an audio-video stream having a time stamp and a maximum propagation delay indication appended thereto and is coupled to an at least partially non-isochronous network via said first brick, said maximum propagation delay indication representing a predetermined transmission time of said audio-video stream;
    wherein said one or more output devices are connected to said at least partially non-isochronous network via said second brick, for receiving said audio-video stream and obtaining said time stamp and said maximum propagation delay indication therefrom, synchronizing said audio-video stream based on an aggregation of said maximum propagation delay indication and said time stamp, and rendering said audio-video stream from said audio-video source device based on the synchronizing; and
    wherein said first and second brick provide protocol conversion through a network interface component and an analog audio-visual component.

8. A system for disaggregating audio-visual systems comprising:
    a brick; and
    one or more audio-visual output devices;
    wherein said one or more output devices are connected to an at least partially non-isochronous network via said brick, for receiving said audio-video stream and obtaining a time stamp and a maximum propagation delay indication therefrom, said maximum propagation delay indication representing a predetermined transmission time of said audio-video stream, synchronizing said audio-video stream based on an aggregation of said maximum propagation delay indication and said time stamp, and rendering an audio-video stream from an audio-video source device based on the synchronizing; and
    wherein said brick provides protocol conversion through a network interface component and an analog audio-visual component.

9. A system as recited in claim 8 wherein said brick is a separate component from said one or more output devices.

10. A system as recited in claim 8 wherein said brick is integrated into said one or more output devices.

11. A method in a computing environment for synchronizing the rendering of a portion of an audio-visual stream from a source device on one or more output devices comprising:
   identifying on an at least partially non-isochronous distribution network, a time master;
   providing to said source device and the one or more output devices at least one time component, said time component corresponding to information obtained from said time master;
   providing to said one or more output devices a maximum propagation delay indication, said maximum propagation delay indication representing a predetermined transmission time of said portion of said audio-visual stream; and
   utilizing said time component and said maximum propagation delay indication on said one or more output devices, to establish a common time rendering said portion of said audio-visual stream synchronously.

12. A computer system having a processor, a memory and an operating environment, the computer system operable to execute a method for synchronizing the rendering of a portion of an audio-visual stream from a source device on one or more output devices, the method comprising:
   identifying on an at least partially non-isochronous distribution network, a time master;
   providing to said source device and the one or more output devices at least one time component, said time component corresponding to information obtained from said time master;
   providing to said one or more output devices a maximum propagation delay indication, said maximum propagation delay indication representing a predetermined transmission time of said portion of said audio-visual stream; and
   utilizing said time component and said maximum propagation delay indication on said one or more output devices, to establish a common time rendering said portion of said audio-visual stream synchronously.

13. One or more computer-readable media having computer executable instructions for performing a method for disaggregating audio-visual systems, the method comprising:
   providing an audio-visual stream from a source device as one or more data packets for communication over a non-isochronous link of a network;
   transmitting said one or more data packets over said non-isochronous link of said network, each of said one or more data packets having a time stamp and a maximum propagation delay indication appended thereto, said maximum propagation delay indication representing a predetermined transmission time of said one or more data packets;
   receiving said one or more data packets at multiple output devices and obtaining a time stamp, and a maximum propagation delay indication from each of the one or more received data packets; and
   rendering each of said one or more data packets on multiple output devices in a synchronized fashion, wherein the synchronized fashion is based on an aggregation of said obtained maximum propagation delay indication and said obtained time stamp for each data packet.

\* \* \* \* \*